(12) United States Patent
Tokarz et al.

(10) Patent No.: US 9,221,343 B2
(45) Date of Patent: Dec. 29, 2015

(54) PYROTECHNIC HIGH VOLTAGE BATTERY DISCONNECT (71) Applicant: Tesla Motors, Inc., Palo Alto, CA (US)

(72) Inventors: Nicholas Paul Tokarz, San Jose, CA (US); Madan Gopal, Dublin, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 710 days.

(21) Appl. No.: 13/648,950

(22) Filed: Oct. 10, 2012

(65) Prior Publication Data
US 2013/0154352 A1 Jun. 20, 2013

Related U.S. Application Data (60) Provisional application No. 61/576,440, filed on Dec. 16, 2011.

(51) Int. Cl.
B60L 1/00 (2006.01)
B60L 3/00 (2006.01)
H02G 3/00 (2006.01)
B60L 3/04 (2006.01)
H01H 39/00 (2006.01)
B60R 21/00 (2006.01)

(52) U.S. Cl.
CPC ............. B60L 3/04 (2013.01); B60L 3/0046 (2013.01); H01H 39/006 (2013.01); B60R 21/00 (2013.01)

(58) Field of Classification Search
CPC .......... H01H 39/006; H01H 2039/008; H01H 39/00; B60L 3/00; B60L 3/04; B60L 3/0046; B60R 21/00
USPC .......................................... 307/9.1
See application file for complete search history.

(56) References Cited

U.S. PATENT DOCUMENTS

2004/0041682 A1* 3/2004 Pasha et al. ................. 337/401
2009/0023053 A1 1/2009 Berdichevsky et al.
2010/0194519 A1 8/2010 Harris et al.
2010/0271168 A1 10/2010 Niedzwiecki et al.
2012/0105015 A1 5/2012 Hermann et al.
2012/0127621 A1 5/2012 Knapp, Jr. et al.

* cited by examiner

Primary Examiner — Carlos Amaya
(74) Attorney, Agent, or Firm — J. Richard Soderberg (57) ABSTRACT A system for decoupling a HV source from an electric vehicle's electrical system is provided that includes (i) at least one electrical contactor, where the HV source is electrically connected to the vehicle's electrical system when the electrical contactor is in a closed state and not electrically connected to the vehicle's electrical system when the electrical contactor is in an open state; (ii) a supplemental restraint system (SRS) that monitors collision data from a plurality of impact sensors and outputs an activation signal in response to monitored collision data; and (iii) a pyrotechnic switch, where the pyrotechnic switch has a pre-activated first state that provides a conductive path that allows the HV source to be electrically connected to the vehicle's electrical system and an activated second state that severs the conductive path and prevents the HV source from being electrically connected to the vehicle's electrical system.

15 Claims, 8 Drawing Sheets

PYROTECHNIC HIGH VOLTAGE BATTERY DISCONNECT

CROSS-REFERENCE TO RELATED APPLICATION

This application claims the benefit of the filing date of U.S. Provisional Patent Application Ser. No. 61/576,440, filed 16 Dec. 2011, the disclosure of which is incorporated herein by reference for any and all purposes.

FIELD OF THE INVENTION

The present invention relates generally to vehicles and, more particularly, to a means of disconnecting the high voltage battery system of a vehicle in the event of a catastrophic event.

BACKGROUND OF THE INVENTION

The battery system used in a conventional all-electric or hybrid vehicle is required to store large amounts of energy within the confines of a relatively small battery enclosure. In addition to housing tens to thousands of individual cells in order to meet the power requirements of such a vehicle, this type of battery pack must be capable of surviving the inherent thermal and mechanical stresses of a car for a period of years. Additionally, while the housing used to package a multi-cell vehicle battery must be structurally sound enough to allow battery pack inspection and/or replacement, it must do so with minimal weight since hybrids and electric cars are exceptionally sensitive to excess weight. The design of such a vehicle battery pack should also lend itself to efficient, and preferably automated, manufacturing practices.

In addition to the various packaging constraints placed on the battery pack, it is also imperative that the batteries be protected from any event that may lead to one or more of the cells within the pack entering into thermal runaway, thermal runaway occurring when the internal reaction rate increases to the point that more heat is being generated than can be withdrawn. Thermal runaway may be initiated by a short circuit within the cell, improper cell use, physical abuse, manufacturing defects, or exposure of the cell to extreme external temperatures. Given that a thermal runaway event can lead to significant property damage and, in some circumstances, bodily harm or loss of life, the battery systems used in most all-electric or hybrid vehicles employ one or more means of preventing, detecting and mitigating the effects of such an event.

While there are a variety of systems and techniques that may be used to protect the batteries with a vehicle's battery pack as well as the vehicle's occupants during normal vehicle use, it will be appreciated that a vehicle collision presents an extremely difficult challenge given the limited control afforded by such an event. Due to the energy densities and voltages/currents associated with such battery systems, in addition to thermal event containment, during a severe collision it is imperative that the high voltage battery pack be decoupled from the vehicle's electrical system. In such a situation decoupling the battery pack is critical to insuring the safety of the vehicle's occupants as they leave the vehicle, first responders attempting to aid the occupants or control the event, and mechanics/technicians attempting to mitigate potential vehicle damage as well as initiate vehicle repairs.

In a conventional all-electric or hybrid vehicle, inertial switch sensors are commonly used to decouple the battery pack from the electrical system during a crash. Such sensors, however, operate over a relatively large range of g-forces (e.g., 10-35 g's). Additionally, such sensors are relatively insensitive to directionality and are not capable of being programmed to respond differently to different types of events. Accordingly, what is needed is a means of safely and consistently disconnecting the high voltage system in the event of a crash. The present invention provides such a system.

SUMMARY OF THE INVENTION

A system for decoupling a high voltage (HV) source (e.g., a HV battery pack) from an electric vehicle's electrical system (e.g., electric vehicle drive system, electric vehicle charging system, etc.) is provided. The system includes at least one electrical contactor that may be integrated into a power control system, where the HV source is electrically connected to the vehicle's electrical system when the at least one electrical contactor is in a closed state, and where the HV source is not electrically connected to the vehicle's electrical system when the at least one electrical contactor is in an open state. The system also includes a supplemental restraint system (SRS) that monitors collision data from a plurality of vehicle impact sensors and outputs a supplemental restraint activation signal in response to monitored collision data. The system also includes a pyrotechnic switch configured to receive the supplemental restraint activation signal from the SRS, wherein the pyrotechnic switch has a pre-activated first state that provides a conductive path that allows the HV source to be electrically connected to the vehicle's electrical system, and wherein the pyrotechnic switch has an activated second state that severs the conductive path and prevents the HV source from being electrically connected to the vehicle's electrical system, wherein the pyrotechnic switch changes from the pre-activated first state to the activated second state upon receipt of the supplemental restraint activation signal from the SRS.

The system may include a low voltage (LV) power source, where upon receipt of the supplemental restraint activation signal an LV pulse is transmitted to a pyrotechnic initiator corresponding to the pyrotechnic switch, causing the pyrotechnic switch to sever the conductive path and prevent the HV source from being electrically connected to the vehicle's electrical system.

The system may include a low voltage (LV) power source and an electromagnetic relay corresponding to the at least one electrical contactor, wherein when the electromagnetic relay receives power from the LV power source via the conductive path the at least one electrical contactor is placed in the first closed state and when the electromagnetic relay does not receive power from the LV power source via the conductive path the at least one electrical contactor is placed in the second open state. Wherein the pyrotechnic switch, in the activated second state, severs the conductive path and prevents the electromagnetic relay from receiving power from the LV power source, thereby preventing the at least one electrical contactor from being placed in the first closed state and preventing the HV source from being electrically connected to the vehicle's electrical system. The system may further include a vehicle management system configured to output an LV switch activation signal to an LV switch, the LV switch interposed between the LV power source and the electromagnetic relay, where the LV switch closes upon receipt of the LV switch activation signal, thereby allowing power to flow from the LV power source via the conductive path to the electromagnetic relay unless the pyrotechnic switch is in the activated second state. The vehicle management system may output the LV switch activation signal upon receipt of a vehicle on command.

The conductive path that is severed when the pyrotechnic switch is activated may electrically connect the HV source to the at least one electrical contactor, or may electrically connect the at least one electrical contactor to the vehicle's electrical system.

The system may further include a vehicle management system configured to output a pyrotechnic switch activation signal, for example when a thermal runaway event is detected within the battery pack.

The SRS may be configured to output a second supplemental restraint activation signal that triggers deployment of one or more airbags, where the supplemental restraint activation signal utilized by the pyrotechnic switch may be based on a first set of conditions corresponding to the monitored collision data while the second supplemental restraint activation signal utilized by the one or more airbags may be based on a second set of conditions corresponding to the monitored collision data.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
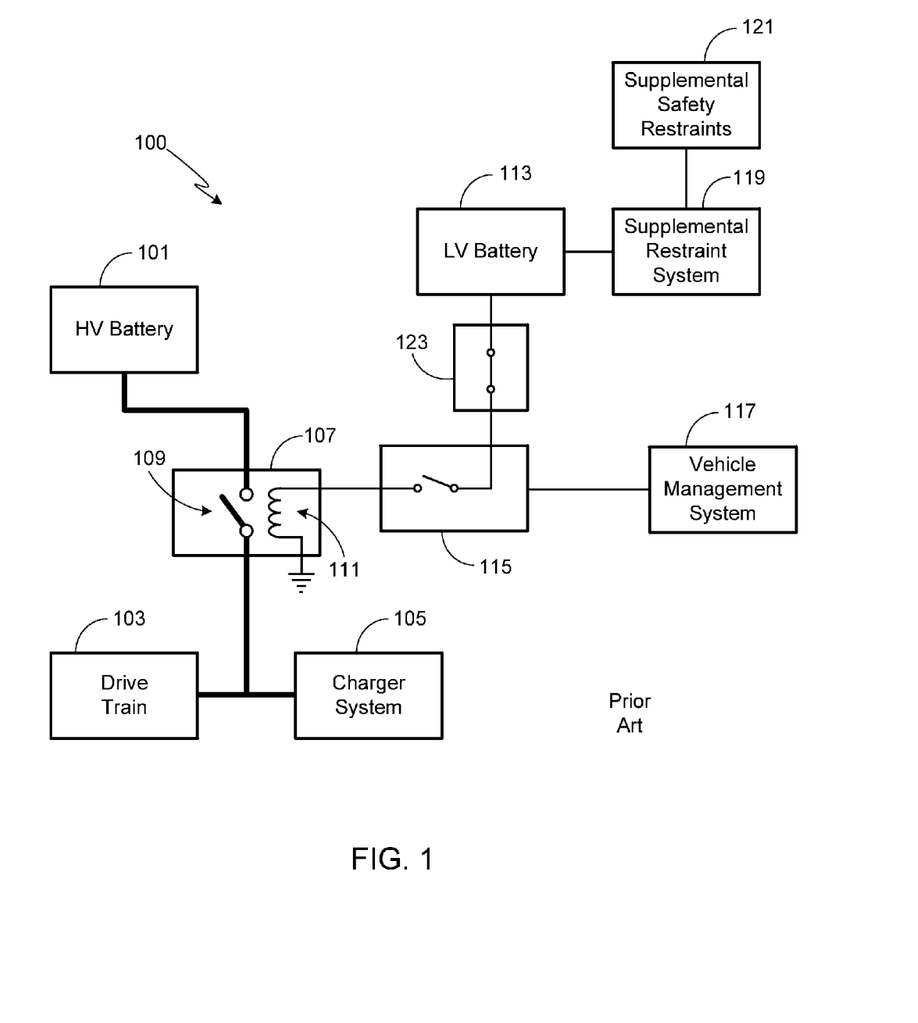
FIG. 1 provides a schematic overview of the electrical system in a conventional electric vehicle.

FIG. 1 provides a schematic overview of the primary components and subsystems associated with a conventional electric vehicle that are relevant to the present invention. Battery pack 101 is a high voltage (HV) energy storage system suitable for use with an electric vehicle. The number of batteries within battery pack 101 depends upon the needs of the electric vehicle, the energy density of the individual batteries, etc. Battery pack 101 is coupled to the vehicle's electrical system, e.g., drive train 103, charging system 105, and various other components and systems associated with vehicle 100. Drive train 103 may utilize a single electric motor coupled to the drive axle via a transmission/differential assembly, or multiple motors coupled to one or both axles. Charger 105, which may be either external or internal to vehicle 100, is used to charge battery pack 101. Typically during charging the charger system 105 is coupled to an external power source, although it may also receive energy to recharge the vehicle's batteries using an internal source, for example a regenerative braking system.

Interposed between HV source 101 and the various vehicle systems coupled to source 101 is a power control system 107. Control system 107 typically includes a DC to AC converter, and may also include a DC to DC converter. Power control system 107 insures that the power delivered to the motor of drive train 103 has the desired voltage, current, waveform, etc. As such, power control system 107 may be comprised of passive power devices (e.g., transient filtering capacitors and/or inductors), active power devices (e.g., circuit protection devices, etc.), sensing devices for monitoring the state-of-charge (SOC) and health of battery 101 (e.g., voltage, current, power flow sensors, temperature, number of charging cycles to date, etc.), logic control devices, communication subsystems, etc.

In addition to controlling the flow of energy to and from battery pack 101 and monitoring battery health, power control system 107 also includes one or more relay switches 109, also referred to as relay contactors or simply contactors, that are used to couple/decouple HV battery pack 101 from the various vehicle electrical systems (e.g., drive train 103, charger system 105, etc.). Under a typical normal use scenario, relay switch(es) 109 is open, thus preventing energy flow, whenever the car is 'off' and the batteries are not being charged, and closed, thus allowing energy flow, whenever the car is 'on' and/or the batteries are being charged. In at least one normal use scenario, relay switch(es) 109 may also be closed even if the car is 'off' and the batteries are not being charged if another vehicle subsystem, such as a battery cooling system, requires power from HV battery pack 101, although preferably in such a scenario power is provided via an external source (i.e., when the car is plugged into the grid) or is provided by HV battery pack 101 using a different contactor (e.g., one that is not required to handle the high current loads associated with the drive train).

Given the voltage and current of a typical electric vehicle battery pack 101, contactor(s) 109 typically employs an electromagnetic relay, although it will be appreciated that other types of switches may be used without departing from the invention. In the illustrated and preferred embodiment, when power is supplied to electromagnet 111, contactor switch 109 closes, thereby coupling HV battery pack 101 to the vehicle's various electrical systems. The power required to activate relay 111, and thus close contactor 109, is provided by a low voltage (LV) battery 113. LV battery 113 may be a simple 12 volt automotive battery, although a different form factor, configuration and/or voltage battery may be used. Switch 115 determines whether or not relay 111 receives power from LV battery 113. When switch 115 is closed, as illustrated in FIG. 2, power from LV battery 113 powers electromagnet 111, thereby causing contactor 109 to close.

The operation of switch 115 is controlled by a vehicle management control system 117. In addition to controlling the operation of switch 115, system 117 controls various vehicle operating systems (e.g., battery cooling/heating subsystem, HVAC subsystem, charging subsystem, etc.). Typically management system 117 is coupled to one or more user interface subsystems. For example, the vehicle's on/off switch, which may be a physical switch (e.g., pushbutton), a proximity switch (e.g., coupled to a user key fob), or other type of switch, is tied to management system 117. When a user activates the vehicle's on/off switch and issues a "vehicle on" command, system 117 closes switch 115, thereby coupling the HV battery 101 to the vehicle's electrical systems. Additionally, vehicle management system 117 closes switch 115 whenever HV battery 101 needs to be coupled to the vehicle's electrical system (e.g., during charging).

In a typical electric vehicle, LV battery 113 may also be used to provide power to a variety of auxiliary systems. In general, the systems coupled to LV battery 113 are those in which it is desirable to maintain power even when HV battery 101 is decoupled from the vehicle's electrical system. For example, LV battery 113 may be coupled to a Supplemental Restraint System (SRS) 119, thus allowing it to function even if power from the HV battery 101 is disconnected. SRS 119 is coupled to a variety of impact sensors that detect the onset of a collision, thus allowing the system to activate various supplemental restraints within milliseconds of the detected event. Furthermore, by including multiple sensors throughout the vehicle, it is possible to detect not only the onset of the collision, but also the direction of impact, thus allowing SRS 119 to tailor the response to the type of collision (e.g., front impact, side impact, rear impact, etc.). The supplemental restraints 121 employed by SRS 119 may include driver and front passenger head airbags, driver and passenger knee airbags, front seat-mounted airbags and side curtain airbags. The airbags may utilize a dual-stage system, thus allowing the airbags to inflate at different speeds depending upon the severity of the impact. The supplemental restraints 121 may also include deployable or resettable seat belt pre-tensioners as well as other interior/exterior vehicle components.

Figure 2:
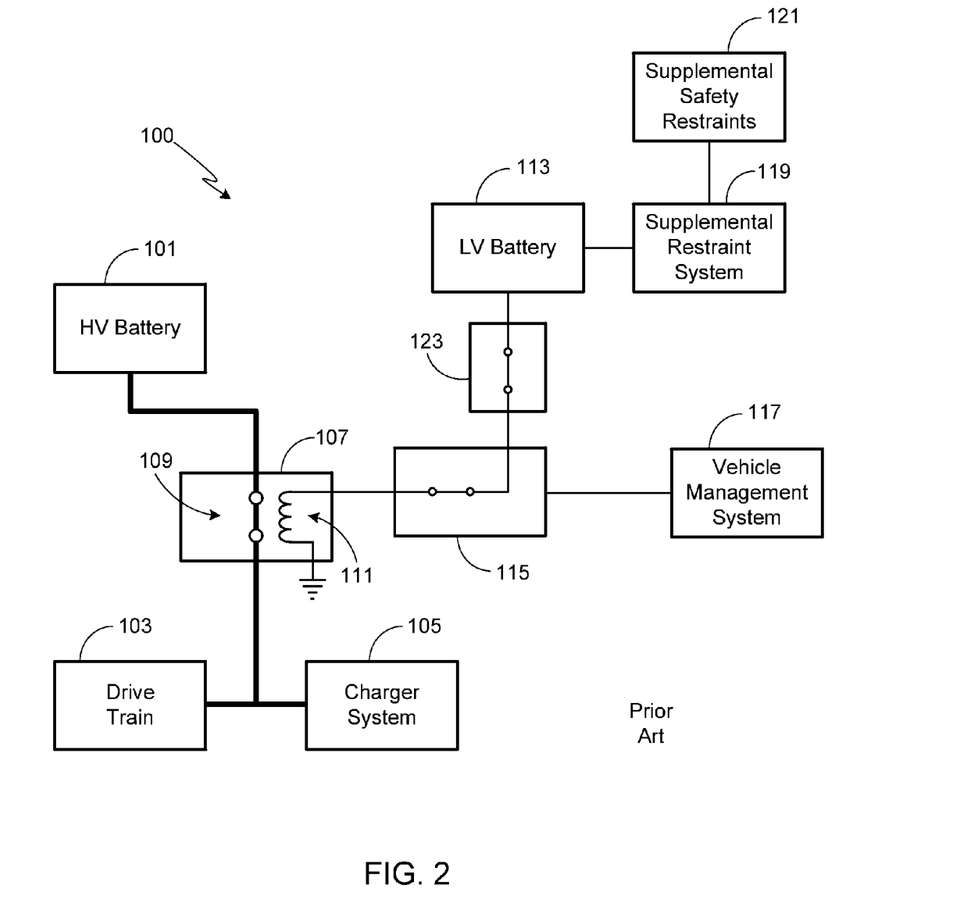
FIG. 2 provides the same overview as shown in FIG. 1, modified to show the closed contactor that allows HV battery to be coupled to the vehicle's electrical system.
Figure 3:
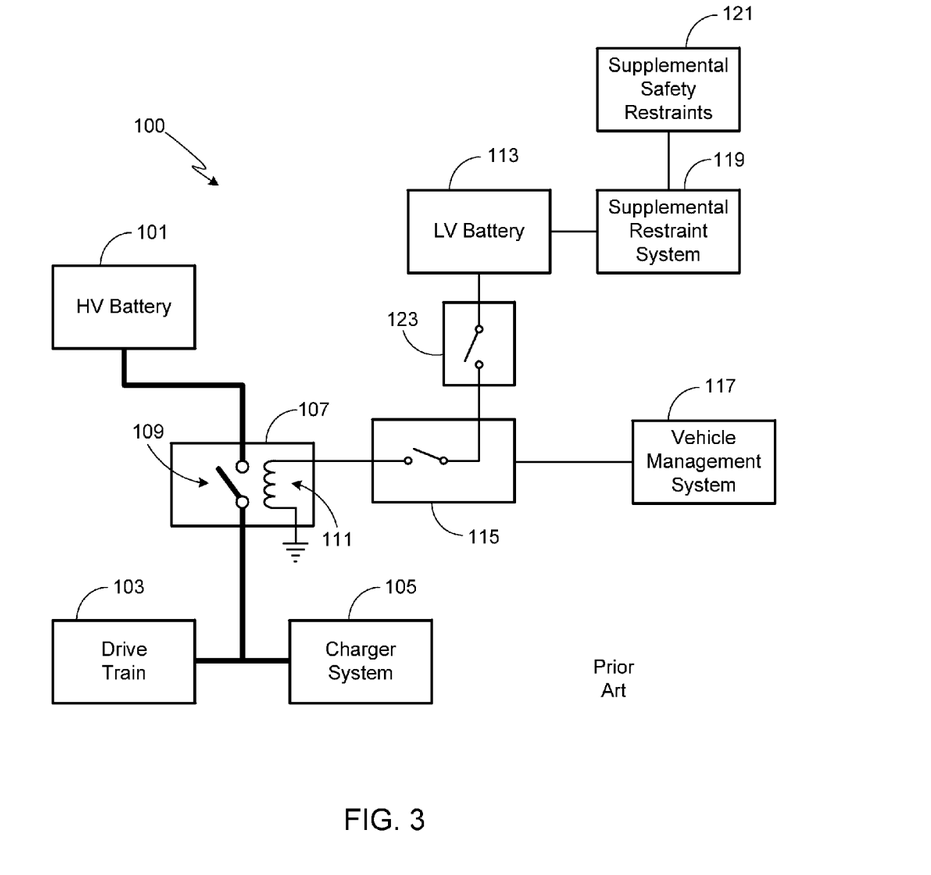
FIG. 3 provides the same overview as shown in FIGS. 1 and 2, modified to show the inertial switch in the open state.

In a conventional electric vehicle system, such as system 100 shown in FIGS. 1-3, an inertial switch 123 is interposed between LV battery 113 and switch 115. Normally, and as illustrated in FIGS. 1 and 2, inertial switch is closed, thus allowing the system to function normally regardless of the state of the system (i.e., regardless of whether contactor 109 is open or closed; regardless of whether switch 115 is open or closed). When inertial switch 123 detects the occurrence of a collision it opens, thereby disrupting power to switch 115 which, in turn, causes contactor 109 to open and HV battery 101 to become decoupled from the vehicle's electrical system as illustrated in FIG. 3.

While inertial switch 123 is capable of decoupling HV battery 101, the inventors have found that such a switch does not provide optimal performance for a variety of reasons. First, inertial switches have a relatively large window of operation, thus not allowing the system to distinguish between minor and major collisions, leading to the HV battery 101 being decoupled in situations in which the collision does not warrant HV battery decoupling. Second, inertial switches are often insensitive to impact direction, once again leading to scenarios in which the HV battery is unnecessarily decoupled from the vehicle's electrical system. Third, due to the simple mechanical nature of an inertial switch, the system is not programmable, thus limiting the ability to tailor the performance of the system for the desired characteristics for a particular vehicle.

To overcome the limitations associated with an inertial switch, the inventors have replaced the inertial switch with a pyrotechnic switch as the means used to decouple the HV battery upon the occurrence of a collision. As described and shown below, a pyrotechnic switch can be integrated into the electric vehicle's electrical system in a variety of ways.

Figure 4:
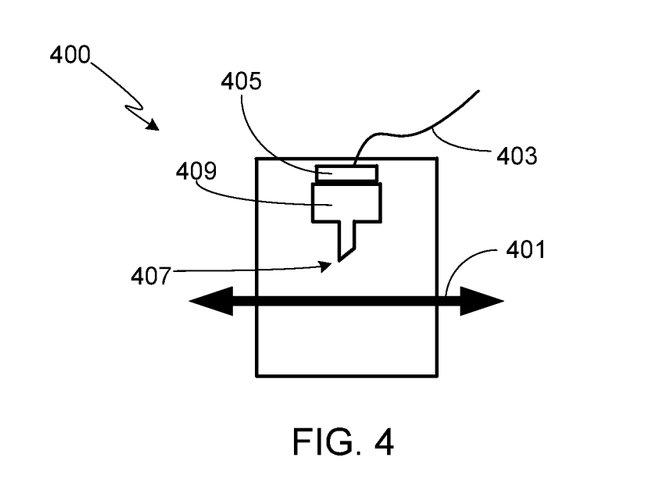
FIG. 4 illustrates a pyrotechnic switch for use in accordance with the invention.
Figure 5:
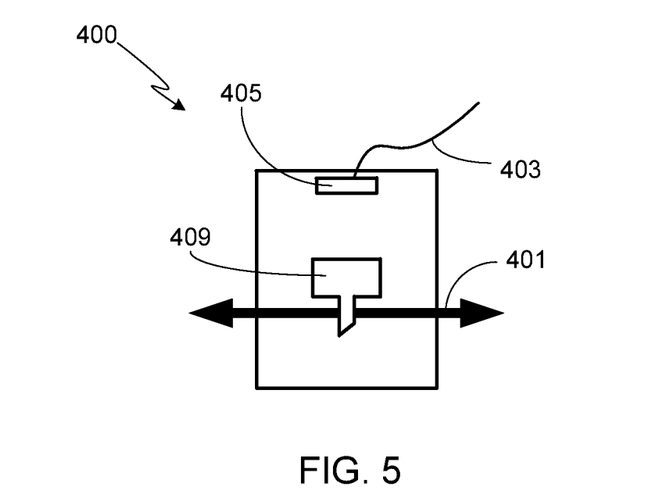
FIG. 5 illustrates the pyrotechnic switch of FIG. 4, shown after activation.

FIGS. 4 and 5 illustrate operation of a typical pyrotechnic switch 400. FIG. 4 illustrates pyrotechnic switch 400 under normal operating conditions. As shown, in this state electrically conductive member 401 forms an electrically conductive pathway. When an event is detected that requires decoupling the HV battery from the vehicle's electrical system, an electrical pulse is sent via signal line 403 to the pyrotechnic initiator 405. When the pyrotechnic initiator 405 is activated, piston 409 is forced forward, causing the cutting edge 407 of piston 409 to break through conductive member 401 which, in turn, severs the conductive path as shown in FIG. 5.

Figure 6:
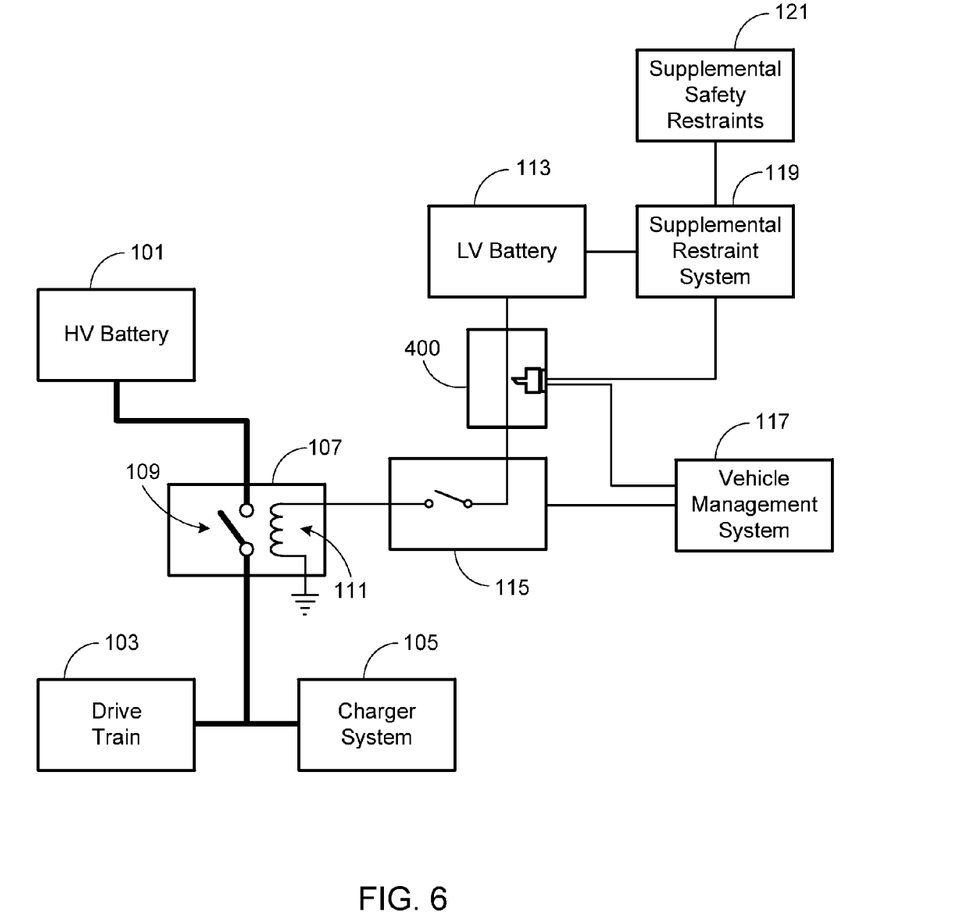
FIG. 6 provides a schematic overview of an electrical system similar to that shown in FIG. 1 with the addition of a pyrotechnic switch.

FIG. 6 illustrates the use of pyrotechnic switch 400 in a typical configuration in accordance with the invention. As shown, under normal operating conditions pyrotechnic switch forms a conductive pathway between LV battery 113 and switch 115, thus allowing switch 115 to be operated normally in order to control the coupling/decoupling of HV battery 101 to the vehicle's electrical systems. Pyrotechnic switch 400 is preferably connected to SRS 119, thus allowing the pyrotechnic switch to be controlled by the directionally sensitive, programmable SRS 119. As a result, both the timing as well as the sensitivity associated with activating the pyrotechnic switch can be programmed, thus allowing HV battery decoupling to be programmed to only occur if the severity of the collision is greater than a preset value, and/or only for collisions occurring in certain directions (e.g., head-on versus rear impact).

In at least one embodiment, and as illustrated in FIG. 6, pyrotechnic switch 400 is also under the control of vehicle management system 117. Although the use of vehicle management system 117 is not required to utilize the pyrotechnic switch to decouple the HV battery during a vehicle collision, the inventors have found that under certain circumstances it is useful to be able to decouple the HV battery from the vehicle's electrical system even under a non-collision related event. For example, during a thermal runaway event, vehicle management system 117 may be programmed to initiate the pyrotechnic switch, thus limiting the load applied to HV battery 101 and potentially reducing the risk of an initial thermal runaway event propagating throughout the battery pack.

Figure 7:
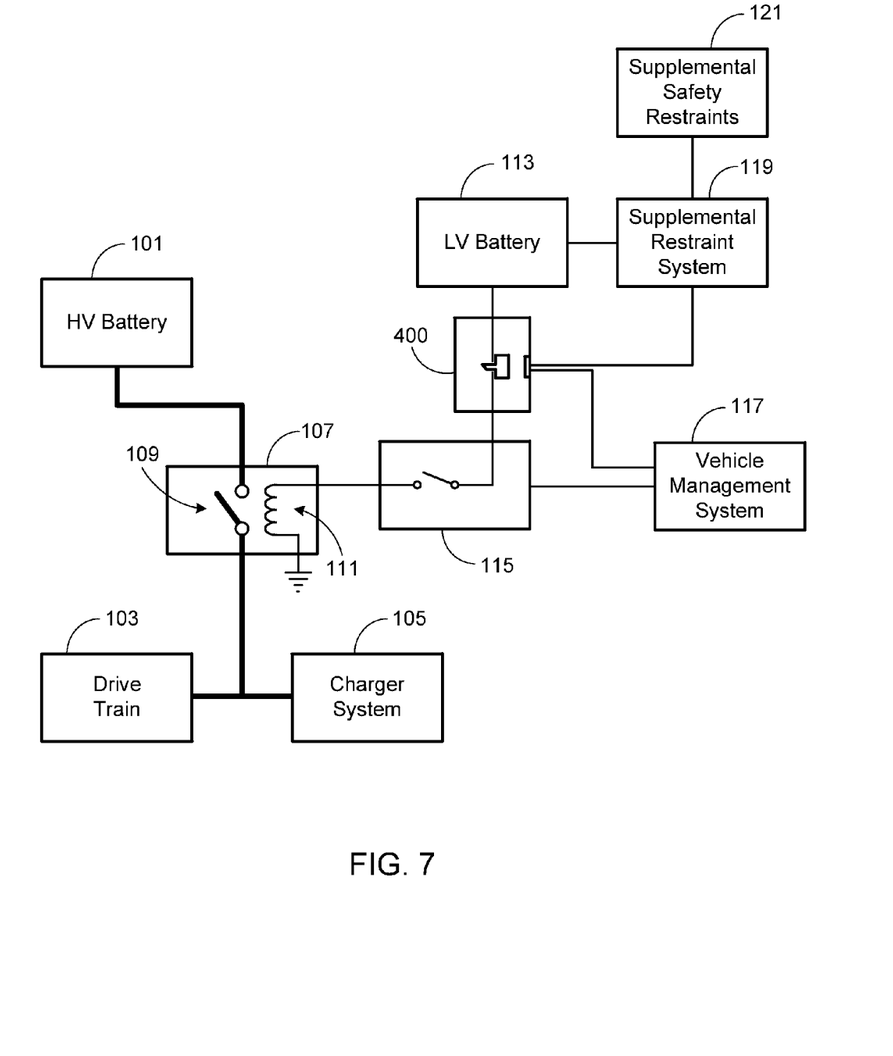
FIG. 7 provides the same overview as shown in FIG. 6, modified to show the system after activation of the pyrotechnic switch.

FIG. 7 provides a similar view of the vehicle's electrical system to that shown in FIG. 6, after pyrotechnic switch 400 has been activated.

Figure 8:
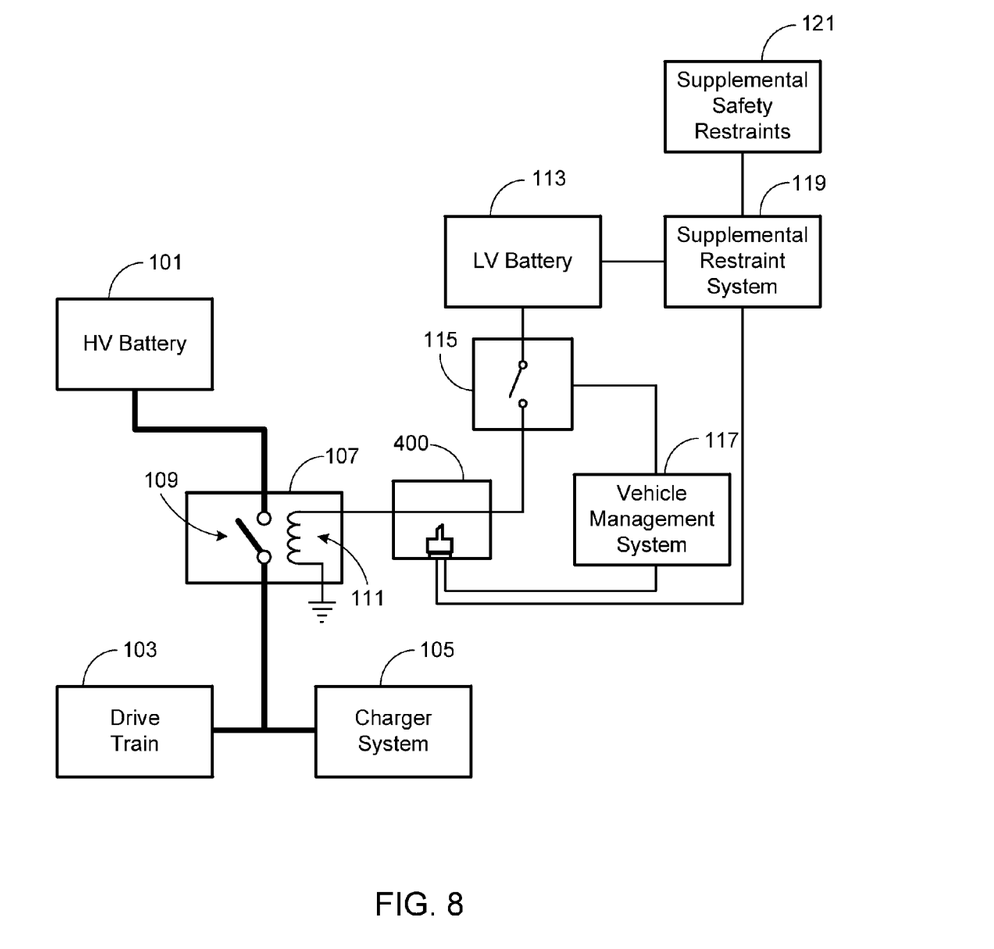
FIG. 8 illustrates an alternate embodiment of the invention using a pyrotechnic switch.

FIG. 8 illustrates an alternate embodiment of the electrical system using pyrotechnic switch 400. In this configuration the pyrotechnic switch serially follows switch 115, rather than being interposed between switch 115 and LV battery 113. The operation of the pyrotechnic switch in this embodiment is the same as in the previous embodiment.

Figure 9:
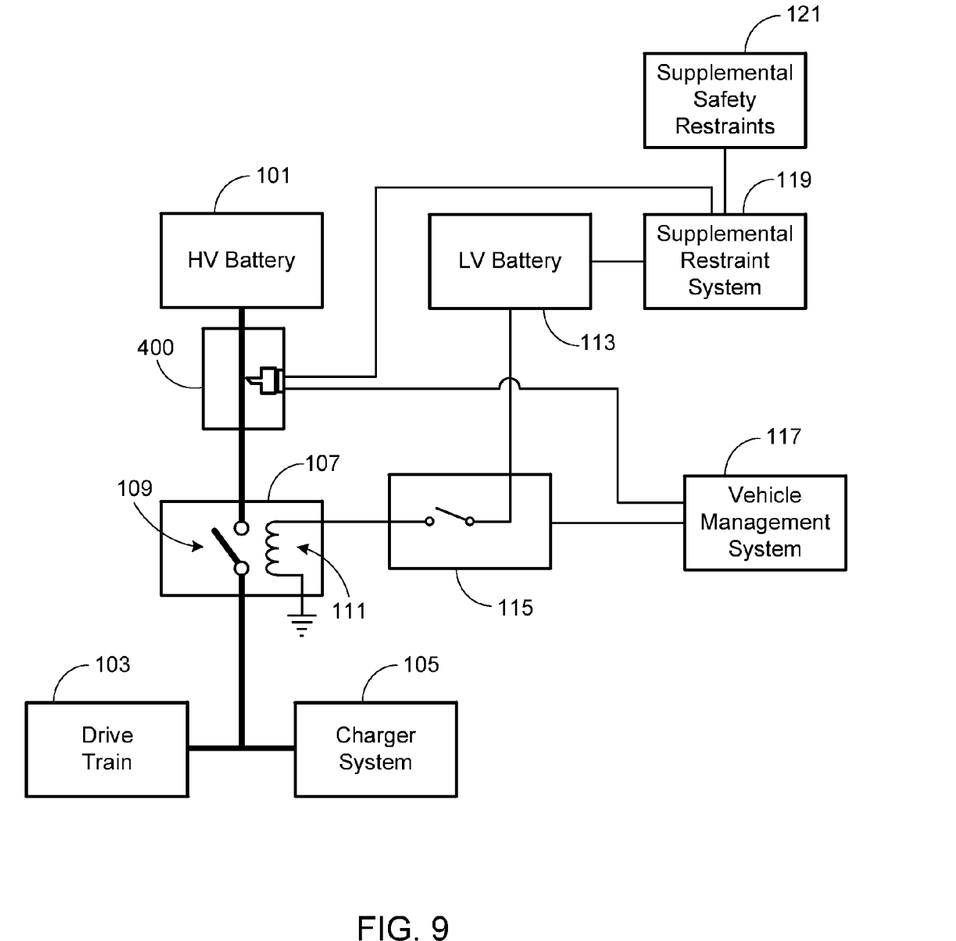
FIG. 9 illustrates an alternate embodiment in which the pyrotechnic switch is used in one of the HV lines to directly sever the connection between the HV battery and the vehicle's electrical system.

FIG. 9 illustrates an alternate embodiment in which the pyrotechnic switch 400 is used in one of the HV lines to directly sever the connection between the HV battery 101 and the vehicle's electrical system. While this embodiment offers the advantage of directly decoupling the HV battery, it is generally not a preferred approach due to the physical size of the high voltage, high current conductor, and thus the need for a larger pyrotechnic device. Additionally, arcing is more likely when using a pyrotechnic switch with the high voltage, high current conductor than it is with the low voltage, low current conductor from LV battery 113. Note that with the embodiment illustrated in FIG. 9, the type of HV contactor (e.g., contactor 109/electromagnet 111) does not matter as the pyrotechnic switch is severing the HV conductor itself, not a LV line powering a contactor electromagnetic relay.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An automatic battery disconnect system for an electric vehicle, comprising:
    a high voltage (HV) energy storage system;
    a vehicle electrical system corresponding to said electric vehicle and comprising a plurality of vehicle subsystems, said plurality of vehicle subsystems comprising an electric vehicle drive system;
    at least one electrical contactor, wherein said at least one electrical contactor has a first closed state and a second open state, wherein when said at least one electrical contactor is in said first closed state said HV energy storage system is electrically connected to said vehicle electrical system, and wherein when said at least one electrical contactor is in said second open state said HV energy storage system is not electrically connected to said vehicle electrical system;
    a supplemental restraint system, wherein said supplemental restraint system monitors collision data from a plurality of vehicle impact sensors and outputs a supplemental restraint activation signal in response to said monitored collision data; and
    a pyrotechnic switch configured to receive said supplemental restraint activation signal from said supplemental restraint system, wherein said pyrotechnic switch has a pre-activated first state and an activated second state, wherein said pyrotechnic switch changes from said pre-activated first state to said activated second state upon receipt of said supplemental restraint activation signal from said supplemental restraint system, wherein said pyrotechnic switch is not reversible from said activated second state to said pre-activated first state, wherein in said pre-activated first state said pyrotechnic switch provides a conductive path that allows said HV energy storage system to be electrically connected to said vehicle electrical system, and wherein in said activated second state said pyrotechnic switch severs said conductive path and prevents said HV energy storage system from being electrically connected to said vehicle electrical system.

2. The automatic battery disconnect system of claim 1, wherein said HV energy storage system is comprised of a battery pack.

3. The automatic battery disconnect system of claim 1, further comprising a low voltage (LV) power source, wherein upon receipt of said supplemental restraint activation signal a LV pulse is transmitted to a pyrotechnic initiator corresponding to said pyrotechnic switch and causing said pyrotechnic switch to sever said conductive path and prevent said HV energy storage system from being electrically connected to said vehicle electrical system.

4. The automatic battery disconnect system of claim 1, further comprising:
    a low voltage (LV) power source; and
    an electromagnetic relay corresponding to said at least one electrical contactor and coupleable to said LV power source, wherein when said electromagnetic relay receives power from said LV power source via said conductive path said at least one electrical contactor is placed in said first closed state, wherein when said electromagnetic relay does not receive power from said LV power source via said conductive path said at least one electrical contactor is placed in said second open state, and wherein in said activated second state said pyrotechnic switch severs said conductive path and prevents said electromagnetic relay from receiving power from said LV power source which prevents said at least one electrical contactor from being placed in said first closed state and prevents said HV energy storage system from being electrically connected to said vehicle electrical system.

5. The automatic battery disconnect system of claim 4, further comprising:
    a vehicle management system configured to output an LV switch activation signal; and
    an LV switch interposed between said LV power source and said electromagnetic relay and configured to receive said LV switch activation signal from said vehicle management system, wherein said LV switch is changed from an LV switch open state to an LV switch closed state upon receipt of said LV switch activation signal from said vehicle management system, wherein when said LV switch is in said LV switch closed state power from said LV power source is allowed to flow via said conductive path to said electromagnetic relay unless said pyrotechnic switch is in said activated second state, and wherein when said LV switch is in said LV switch open state power from said LV power source is not allowed to flow via said conductive path to said electromagnetic relay.

6. The automatic battery disconnect system of claim 5, wherein said vehicle management system outputs said LV switch activation signal upon receipt of a vehicle on command.

7. The automatic battery disconnect system of claim 1, wherein said conductive path electrically connects said HV energy storage system to said at least one electrical contactor.

8. The automatic battery disconnect system of claim 1, wherein said conductive path electrically connects said at least one electrical contactor to said vehicle electrical system.

9. The automatic battery disconnect system of claim 1, further comprising a vehicle management system configured to output a pyrotechnic switch activation signal, wherein said pyrotechnic switch changes from said pre-activated first state to said activated second state upon receipt of said pyrotechnic switch activation signal from said vehicle management system.

10. The automatic battery disconnect system of claim 1, wherein said vehicle management system outputs said pyrotechnic switch activation signal when a thermal runaway event is detected within said HV energy storage system.

11. The automatic battery disconnect system of claim 1, wherein said supplemental restraint system outputs a second supplemental restraint activation signal in response to said monitored collision data, wherein said second supplemental restraint activation signal triggers deployment of at least one airbag.

12. The automatic battery disconnect system of claim 11, wherein said supplemental restraint system outputs said supplemental restraint activation signal in response to a first set of conditions corresponding to said monitored collision data and outputs said second supplemental restraint activation signal in response to a second set of conditions corresponding to said monitored collision data.

13. The automatic battery disconnect system of claim 1, said plurality of vehicle subsystems further comprising an electric vehicle charging system.

14. The automatic battery disconnect system of claim 1, wherein said at least one electrical contactor is integrated in a power control system.

15. The automatic battery disconnect system of claim 1, wherein said supplemental restraint system outputs said supplemental restraint activation signal in response to said monitored collision data and in accordance with a set of programmed instructions.

\* \* \* \* \*